United States Patent [19]
Keifer et al.

[11] Patent Number: 6,092,809
[45] Date of Patent: Jul. 25, 2000

[54] SECONDARY SEAL FOR A SEALING ARRANGEMENT

[75] Inventors: William N. Keifer, Sugar Grove; Stephen J. Pierz, Peoria; Gregory M. Wetterich, Newark, all of Ill.

[73] Assignee: Caterpillar Inc., Peoria, Ill.

[21] Appl. No.: 09/045,607

[22] Filed: Mar. 20, 1998

[51] Int. Cl.$^7$ ........................ F16S 15/38
[52] U.S. Cl. .............. 277/390; 277/397; 277/589; 277/914
[58] Field of Search ........................ 277/352, 390, 277/396, 397, 408, 589, 914, 928, 944

[56] References Cited

U.S. PATENT DOCUMENTS

| | | | |
|---|---|---|---|
| 3,540,743 | 11/1970 | Ashton et al. | 277/390 X |
| 3,940,154 | 2/1976 | Olsson | 277/408 X |
| 4,105,214 | 8/1978 | Schexnayder | 277/408 X |
| 5,695,201 | 12/1997 | Wheeler | 277/944 X |
| 5,842,701 | 12/1998 | Cawthorne et al. | 277/407 X |

*Primary Examiner*—Anthony Knight
*Assistant Examiner*—Karlena D. Schwing
*Attorney, Agent, or Firm*—O. Gordon Pence

[57] ABSTRACT

A sealing arrangement for sealing lubricating oil in and debris out of a final drive of an earth moving machine is disclosed. The sealing arrangement includes a secondary seal for use in severe environments to protect a primary oil seal. The secondary seal is disposed radially outboard of the primary seal and includes a continuous annular ring having a wear resistant reinforced composite sealing portion. The sealing portion is constructed of a cured mix of an elastomer and reinforcing fibers, having an axial sealing face positionable in dynamic sealing contact with a radial surface of a first member of the final drive.

15 Claims, 2 Drawing Sheets

SECONDARY SEAL FOR A SEALING ARRANGEMENT

CROSS REFERENCE TO RELATED APPLICATIONS

This application is based, in part, on the material disclosed in U.S. provisional patent application Ser. No. 60/043,396 filed Apr. 2, 1997.

TECHNICAL FIELD

This invention relates generally to a sealing arrangement and, more particularly, to a secondary seal for use in severe environments.

BACKGROUND ART

Earth-moving machines, such as track type tractors, hydraulic excavators, and the like, frequently operate in severe environments, which submerge drive line components, such as final drives and the like, in a slurry of mud, water, and other injurious debris. The final drives of such machines may have a split housing containing gears and bearings which must remain lubricated and free of contaminants in order to operate properly over an extended period of time. The split housing of such final drives has a first member which remains stationary and a second member which rotates about the axis of the drive axle relative to the first member. A metal-to-metal face-type seal is frequently is used in such applications to seal lubricating oil in and debris out of the final drive housing. Such metal-to-metal face seals serve as the primary oil seal and may be of any suitable type, such as disclosed in U.S. Pat. No. 3,180,648, which issued Apr. 27, 1975 to Kupfert et al., and U.S. Pat. No. 3,905,607, which issued Sep. 16, 1975 to Roy L. Maguire et al., both of said patents being assigned to the assignee hereof. The seals, while satisfactory for normal operation, are found to have some drawbacks when the environment becomes too severe, particularly when the final drive housing is submerged in a watery slurry of mud, sand and other abrasive materials. In such conditions, the slurry of mud can flood the passageway to the primary metal-to-metal seal. If the rotatable member of the split housing is not perfectly true, the housing can rotate in an eccentric pattern which may cause a pumping action which forces the slurry of mud under substantial pressure against the metal-to-metal seal. As a result, such contaminants can be forced past the primary seal and into the lubricated gear chamber of the final drive. Another problem of the prior art seals is that the pumping action of the slurry forces dirt and grit between the sealing faces of the metal-to-metal seal which produces excessive wear and early failure of the primary metal-to-metal seal.

Secondary seals have been used in the past in an attempt to protect the primary seal against such abrasive slurries. However, such prior secondary seals have met with only limited success because of their construction. Such secondary seals typically have been constructed from lengths of rope or other material, which have a pair of ends that must be joined together, either mechanically with staples or the like, or chemically with an adhesive. Either type of joint connection is generally less strong in tension than the seal material itself, thus causing a weak link. This weak link frequently fails, allowing the ends to separate.

Also, prior secondary seals do not have a particularly hard sealing face, which causes a high wear rate in the presence of the abrasive and non-lubricated environment in which such secondary seals are intended to operate.

The present invention is directed overcoming one or more of the problems set forth above.

DISCLOSURE OF THE INVENTION

In one aspect of the present invention, a secondary seal is provided for use in severe environments between a first member of an earth-moving machine and second member rotatable about an axis relative to the first member. The secondary seal is carried on the second member and includes a continuous annular ring have a wear-resistant, reinforced composite sealing portions. The sealing portion is constructed of a cured mix of an elastomer and reinforcing fibers and has an axial sealing face positionable in dynamic sealing contact with the first member.

In another aspect of the present invention, a sealing arrangement is provided for sealing lubricating oil in and debris out of an earth-moving machine between a first member and a second member of such machine. The second member is rotatable about an axis relative to the first member. The sealing arrangement comprises a primary oil seal disposed between the first and second members of the machine and a secondary seal disposed radially outboard of the primary seal. The secondary seal is adapted to be carried by the second member and includes a continuous annular ring having a wear resistant reinforced composite sealing portion. The sealing portion is constructed of a cured mix of an elastomer and reinforcing fibers and has an axial sealing face positionable in dynamic sealing contact with the first member.

BEST MODE FOR CARRYING OUT THE INVENTION

Figure 1:
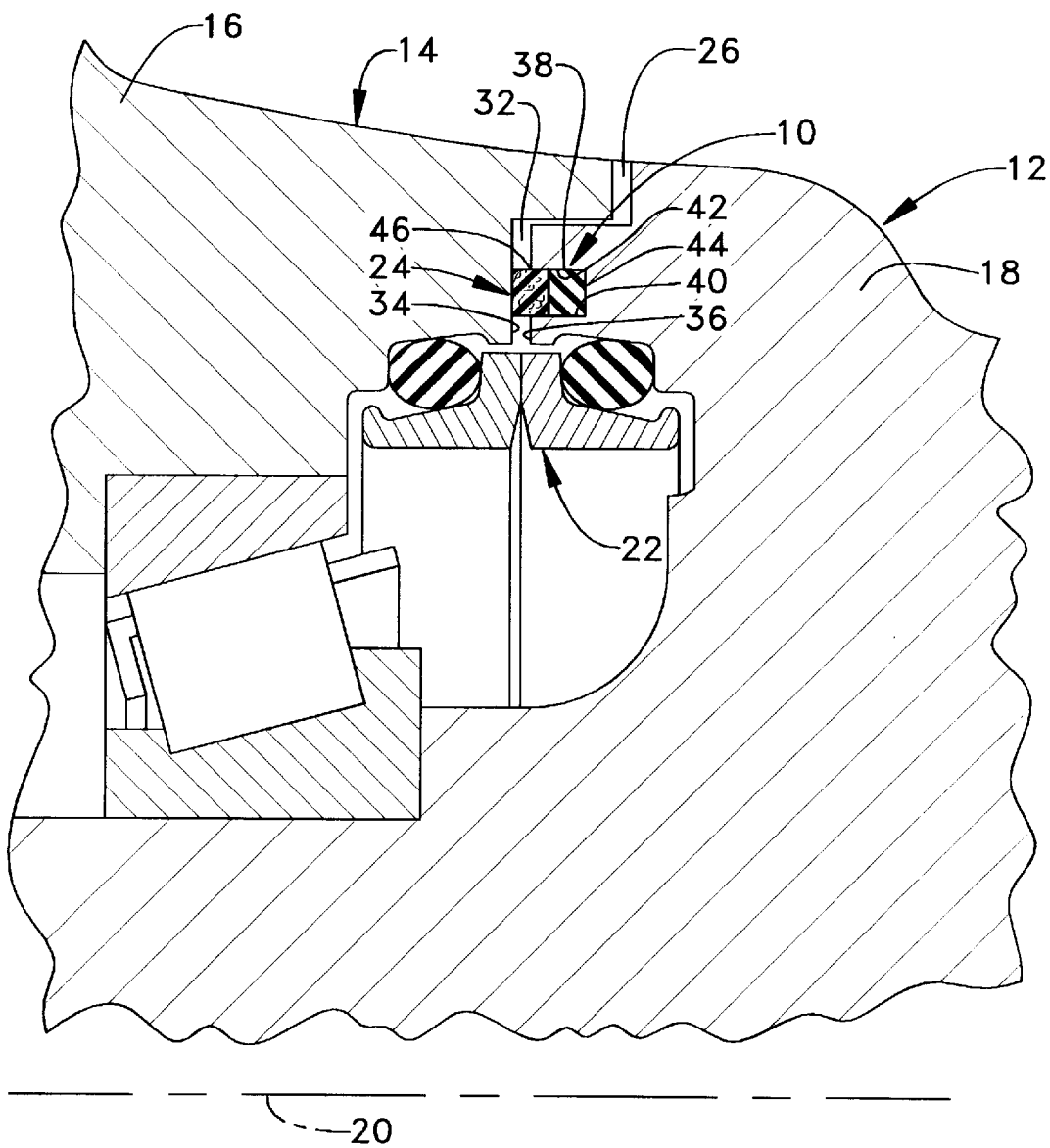
FIG. 1 is a fragmentary cross-sectional view of a final drive of an earth-moving machine and illustrating a sealing arrangement embodying the principles of the present invention.

Referring more particularly to the drawings, a sealing arrangement is generally illustrated at 10 in FIG. 1 for sealing lubricating oil in and debris out of a final drive 12 of an earth-moving machine (not shown). The final drive 12 includes a split housing 14 having a stationary or first member 16 and a rotatable or second member 18. The second member 18 is mounted for rotation about an axis 20 relative to the first member 16.

The sealing arrangement 10 includes a primary oil seal 22 and a secondary seal 24. The primary oil seal 22 is preferably of a metal-to-metal face type seal and may be of any construction well known in the art. In particular, the primary oil seal may be of the type disclosed in U.S. Pat. No. 3,180,648 or any of its prodigy. The secondary seal 24 is located outboard of the primary seal 22 in a gap 26 along the split between the first member 16 and the second member 18. The gap may be, but is not necessarily, constructed in the form of a labyrinth to further restrict the ingress of contaminants. Such gap 26 includes a radial portion 32. In particular, the secondary seal 24 is preferably disposed along the radial portion 32. Such radial portion 32 includes a first radial surface 34 provided on the first member 16 and a second radial surface 36 provided on the second member 18. The second radial surface 36 is disposed in spaced opposing relation to the first radial portion 34.

A groove 38 is preferably provided in the second radial surface 36 of the second member 18 which is adapted for receipt of the secondary seal 24. The groove 38 is preferably of a rectangular construction having an axially extending inner-side surface 40, and axially extending outer-side surface 42 and a bottom surface 44. The groove 38 also provides an open end 46 facing the first radial surface 34. The bottom surface 44 of the groove 38 is spaced a predetermined distance from the first radial surface 34 when the first and second members 16, 18, respectively, are in their assembled positions.

Figure 2:
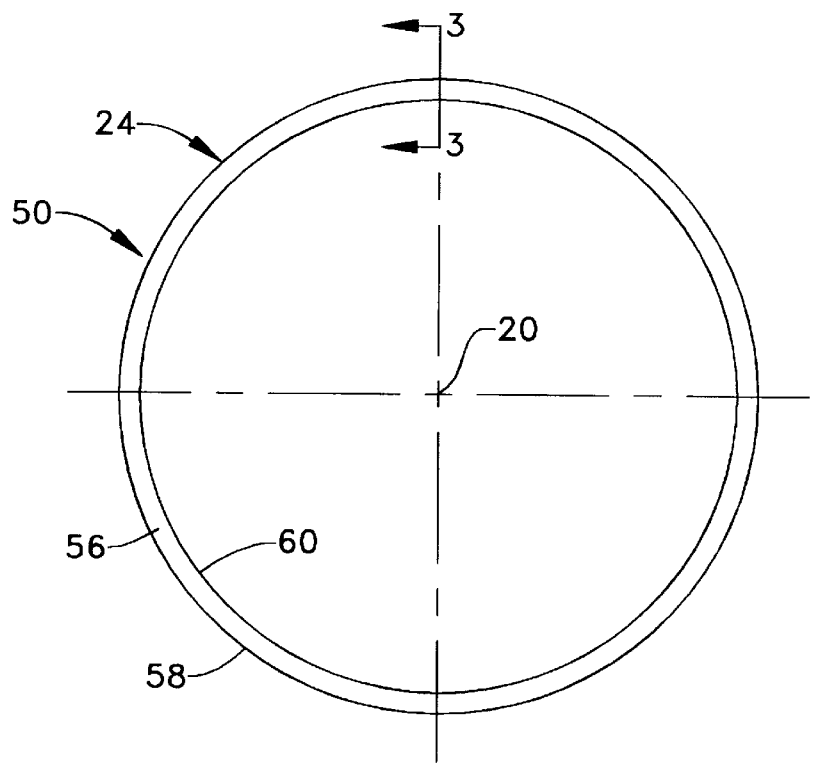
FIG. 2 is a side view, in elevation, of a secondary seal illustrated in FIG. 1.

The purpose of the secondary seal 24 is to protect the primary oil seal 22 and includes a continuous annular ring 50 (FIG. 2) having a wear-resistant, reinforced composite sealing portion 52 (FIG. 3) and an axial biasing portion 54 positionable adjacent the sealing portion 52. The sealing portion 52 is constructed of a cured mix of an elastomer and reinforcing fibers and has an axial sealing face 56 positionable in dynamic sealing contact with the first radial surface 34 of the first member 16. In one construction of the sealing portion, a cured mix from a heelstock containing a nitrile rubber and reinforcing fibers of an aramid material has been used. This heelstock material was made by J. M. Clipper Corporation, whose corporate offices are located in Denver, Colo. However, the present invention is not intended to be limited to the preceding described materials, as those skilled in the art will appreciate that a mix of other suitable elastomeric and reinforcing fibers may be substituted for those identified with satisfactory results.

On the other hand, the axial biasing portion 54 is preferably constructed of a natural rubber, which is made as an integral part of the sealing portion 52. The rubber of the biasing portion 54 preferably has a durometer hardness within a range of about 60 to 90 Shore A. The hardness of the sealing portion 52 is more difficult to determine because of its mix, but is of a substantially greater hardness and greater rigidity than the biasing portion 52.

The annular ring 50 of the secondary seal 22 has a generally rectangular cross-sectional configuration similar to the groove 38 with an outer cylindrical surface 58 and an inner cylindrical surface 60. The outer cylindrical surface 58 has a predetermined outside diameter that is no greater than the outer side surface 42 of the groove 38 to permit easy installation of the secondary seal 24 into the groove 38. The inner cylindrical surface 60 has a predetermined inside diameter that is slightly less than the inner side surface 40 of the groove 38 so as to require the seal 24 to be stretched in order to be mounted within the groove 38. This stretching is useful in retaining the secondary seal 24 in the groove 38 during assembly.

The annular ring 50 also includes an inner end 62 to provide the secondary seal 24 with an axial length 64 which is equal to or greater than the distance between the first radial surface 34 and the bottom surface 44 of the groove 38. This causes the biasing portion 54 of the secondary seal 22 to be axially compressed when the first member 16 and second member 18 are in an assembled condition, thereby generating a force to bias the sealing portion 52 into sealing engagement against the first radial surface 34.

Figure 3:
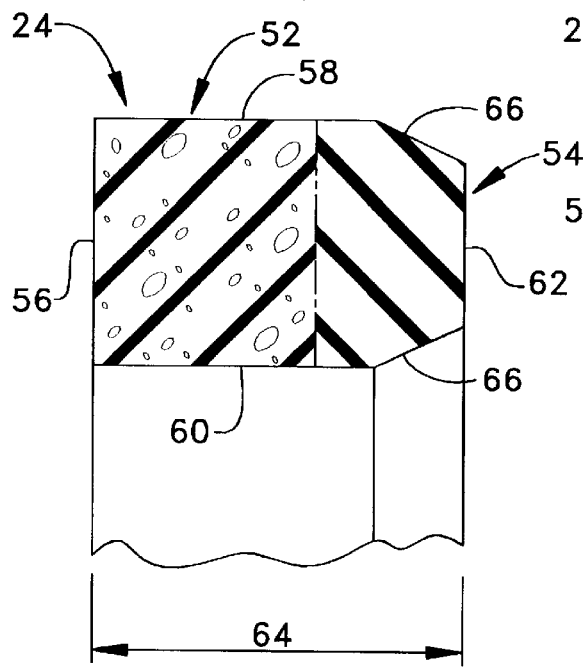
FIG. 3 is a fragmentary cross-sectional view taken along line 33 in FIG. 2 illustrating one embodiment of the secondary seal.

To accommodate the bulging of the biasing portion 54 when being axially compressed, the inner end 62 may have chamfers 66 as shown in FIG. 3.

Figure 4:
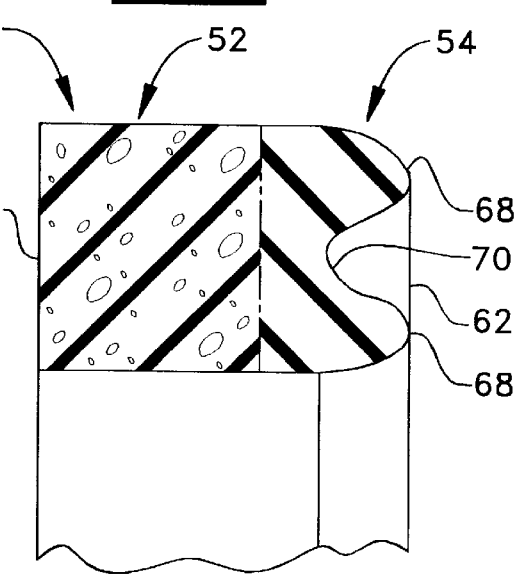
FIG. 4 is a fragmentary cross-sectional view, similarly to FIG. 3, but illustrating another embodiment of the secondary seal.

Alternately, the inner end 62 of the biasing portion 54 may be provided with peaks 68 and valleys 70, as shown in FIG. 4, as a substitute for the chamfers 66. In either case, sufficient room is provided for the biasing portion 54 to expand into when compressed. However, the configurations just described are not intended to be limiting, as those skilled in the art will appreciate that other suitable configurations for the biasing portion can be made for this purpose without departing from the spirit of the present invention.

The secondary seal 24 is preferably made in a molding process, wherein a mix of nitrile rubber and aramid fibers are added to a mold of suitable shape to form a first layer in the mold. Then, a layer of natural rubber is added on top of the first layer. The laminated composite material is then pressurized and heated to cure the rubbers in a manner well known in the art.

In the way of an example, a secondary seal 24 with a 490 mm inside diameter was constructed having a cross-sectional axial thickness of about 10.8 mm and a radial thickness of about 9 mm. Such a seal provided an initial axial load of approximately 0.45 $N/mm^2$.

INDUSTRIAL APPLICABILITY

The construction of the present sealing arrangement 10, as herein described, provides a primary oil seal 22 and a secondary seal 24 for sealing oil in and deleterious foreign matter out of a final drive 12 or other drive train component of an earth moving machine. Those skilled in the art will understand and appreciate that it is not intended that the secondary seal 24 be one hundred percent effective in sealing out mud slurry and other matter or in sealing in the lubricating oil of the final drive. If this were the case, there would be no need for the primary seal 22. The primary function of the secondary seal 24, then, is to protect the primary seal by restricting the amount of mud, abrasives or other foreign matter that gets through to the primary seal 22, thereby reducing the exposure of the primary seal to wear and damage, thus extending its service life.

In operation, the rotation of the second member 18 frequently results in a pumping action on the slurry of mud, which pressurizes the slurry. The severe restriction afforded by the secondary seal 24 creates a sufficient pressure drop across its sealing face 56 such that a minimal amount of pressure is exerted on the primary seal 22 by such slurry. As a result, there is less risk that the pressurized slurry will be forced past the primary seal 22.

Secondary seals in the past have been constructed from lengths of rope or other material, which have a pair of ends that must be joined together, either mechanically with staples or the like, or chemically with an adhesive. Either type of joint connection is generally less strong in tension than the seal material itself, thus causing a weak link. This weak link frequently fails, allowing the ends to separate. On the other hand, the present secondary seal 24 is constructed as a continuous ring without ends. Therefore, it is of a uniform breaking strength, thereby eliminating the weak link at the joined ends of prior secondary seals.

Also, prior secondary seals do not have a particularly hard sealing face, which causes a high wear rate in the presence of the abrasive and non-lubricated environment in which such secondary seals are intended to operate. In the present secondary seal 24, the sealing portion 52 is of a harder, more rigid construction than that of similar sealing portions of prior secondary seals and of the biasing portion 54. This is possible because the biasing function is separate from the sealing function, the biasing function being provided solely by the biasing portion 54.

Other aspects, objects, and advantages of the present invention can be obtained from a study of the drawings, the disclosure and the appended claims.

What is claimed is:

1. A secondary seal for use in severe environments between a first member of an earth moving machine and a second member rotatable about an axis relative to the first member, said secondary seal being adapted to be carried on said second member and comprising:

a continuous annular ring having a wear resistant reinforced composite sealing portion, said sealing portion being constructed of a cured mix of an elastomer and reinforcing fibers and having an axial sealing face positionable in dynamic sealing contact with said first member.

2. The seal of claim 1, wherein said annular ring includes an axial biasing portion positionable adjacent said sealing portion, said biasing portion being adapted to exert an axial force on said sealing portion for urging said sealing face into axial sealing contact with said first member.

3. The seal of claim 2, wherein said elastomer of said sealing portion is of a nitrile rubber and said reinforcing fibers are of an aramid material.

4. The seal of claim 3, wherein said axial biasing portion is constructed of a natural rubber and is made integral with said sealing portion.

5. The seal of claim 4, wherein said rubber of said biasing portion has a durometer hardness within a range of about 60–90 Shore A.

6. The seal of claim 5, wherein said sealing portion has a hardness that is substantially greater than said biasing portion.

7. A sealing arrangement for sealing lubricating oil in and debris out of an earthmoving machine between a first member and a second member of such machine, said sealing arrangement comprising in combination:

a first member and a second member of said machine, said second member being rotatable about an axis relative to said first member;

a primary oil seal disposed between said first and second members of said machine; and a secondary seal disposed radially outboard of said primary seal, said secondary seal being adapted to be carried by said second member and including a continuous annular ring having a wear resistant reinforced composite sealing portion, said sealing portion being constructed of a cured mix of an elastomer and reinforcing fibers and having an axial sealing face positionable in dynamic sealing contact with said first member.

8. The sealing arrangement of claim 7, wherein said first member has a first radially disposed surface formed thereon and said second member has a second radially disposed surface having a groove therein, said second surface being disposed in spaced opposing relation to said first radial surface and said groove being of a configuration to receive and mount said secondary seal therein.

9. The sealing arrangement of claim 8, wherein said elastomer of said sealing portion is of a nitrile rubber and said reinforcing fibers are of an aramid material.

10. The sealing arrangement of claim 9 wherein said continuous annular ring includes an axial biasing portion and wherein said axial biasing portion is constructed of a natural rubber and is made integral with said sealing portion.

11. The sealing arrangement of claim 10 wherein said rubber of said biasing portion has a durometer hardness within a range of about 60–90 Shore A.

12. The sealing arrangement of claim 11, wherein said sealing portion has a hardness that is substantially greater than said biasing portion.

13. The sealing arrangement of claim 12 wherein said secondary seal has an inner cylindrical surface and an outer cylindrical surface, and said groove has an axially extending inner side surface and an axially extending outer side surface, said outer side surface has a predetermined outside diameter that is no greater than said outer side surface of said groove, while said inner cylindrical surface has a predetermined inside diameter that is slightly less than said inner side surface of said groove to require said secondary seal to be stretched in order to be mounted within said groove.

14. The sealing arrangement of claim 13 wherein said groove includes a radially extending bottom surface and an open end facing said first radial surface, said bottom surface being spaced a predetermined distance from said first radial surface when said first and second members are in their assembled positions, and wherein said secondary seal has an axial length to cause said biasing portion of said secondary seal to be axially compressed, thereby generating a force to bias said sealing portion into sealing engagement against said first radial surface.

15. The sealing arrangement of claim 14 wherein said primary oil seal is a metal-to-metal face seal.

\* \* \* \* \*